Figure 1:
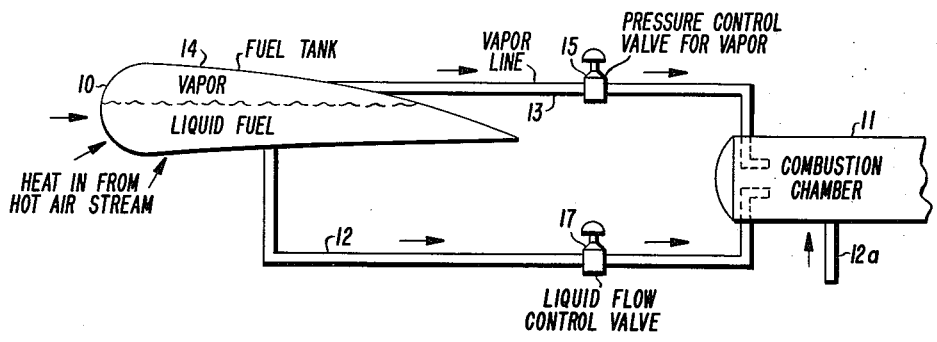

March 14, 1961   J. J. KOLFENBACH ET AL   2,974,475
METHOD FOR OPERATING A ROCKET MOTOR OR THE LIKE
Filed April 6, 1955

JOHN J. KOLFENBACH
JOHN P. LONGWELL          INVENTORS
WALTER W. GLEASON

BY Richard J. Nagel  ATTORNEY

United States Patent Office 2,974,475
Patented Mar. 14, 1961

2,974,475
METHOD FOR OPERATING A ROCKET MOTOR OR THE LIKE

John J. Kolfenbach, North Plainfield, and John P. Longwell, Westfield, N.J., assignors to Esso Research and Engineering Company, a corporation of Delaware Filed Apr. 6, 1955, Ser. No. 499,583
10 Claims. (Cl. 60—35.4)

This invention relates to a method for operating a rocket or jet engine or the like of the class generally referred to as reaction motors. It more especially relates to a method for operating such engines under conditions exposing certain parts to excessive temperatures so that cooling is required. The invention also relates to improved fuel and lubricating compositions for use in such engines.

In the operation of jet aircraft, rockets, and similar devices which travel at high speeds, often exceeding that of sound, a substantial amount of heat is generated due to friction between the surface of the aircraft and the atmosphere. This results in substantial increases in the temperature of various parts of the aircraft such as the wings, which contain the fuel tank and engine. The resulting high temperatures have created special problems in preventing undesired vaporization of the fuel employed while in the fuel tank. In connection with this latter problem it is necessary to maintain the fuel in the tanks at a very high pressure or to insulate the fuel tanks heavily, thus imposing an undesirable weight and volume penalty on the aircraft. In the operation of rocket motors, an independent problem is created by the heat generated in the combustion chamber. Although high temperatures of exhaust gases are necessary in rocket operation, constant exposure to such temperatures adversely affects the mechanical strength of various metallic and ceramic parts so that effective means for cooling them must be provided. Such cooling means must serve to remove heat from the rocket liner, nozzle, and other solid parts without cooling the exhaust gases inside the rocket.

According to the present invention, efficient cooling for fuel tanks, bearings, engines, and the like is effected by providing a hydrocarbon composition comprising a constituent capable of decomposing to a useful fuel composition in heat exchange relation with the part to be cooled. The heat required to decompose the hydrocarbon is absorbed from the fuel tank or engine, which is thus cooled, and the resultant fuel is then burned in the combustion chamber. A particularly desirable class of materials for this purpose are those which depolymerize to form a conjugated diolefin. A preferred material is dicyclopentadiene, which absorbs a substantial quantity of heat in depolymerizing to cyclopentadiene, the latter being a highly effective fuel. Methyl dicyclopentadiene and dimethyl dicyclopentadiene either in admixture with one another and/or with dicyclopentadiene or alone are also highly desirable fuels.

It is an object of the present invention, therefore, to provide a method for operating high speed aircraft operated by a rocket or jet engine or the like in which a cooling effect is obtained by the decomposition of a hydrocarbon material into a useful fuel constituent for the aircraft.

It is another object to provide an improved fuel composition for rockets and the like containing a substantial proportion of a hydrocarbon which decomposes into a conjugated diolefin by the absorption of heat.

It is a further object of the present invention to provide a method for cooling the fuel tanks of aircraft operating at high speed by absorbing the frictional heat generated during flight in a layer of hydrocarbon fuel constituent in heat exchange relation with the heated surface of the aircraft.

It is a still further object of the present invention to provide a method for lubricating the bearings in a jet engine or the like by circulating a lubricant containing a hydrocarbon constituent which absorbs heat from the engine while decomposing into a useful fuel constituent, which is then burned together with excess lubricant.

These and other objects, which will be in part apparent and in part specifically pointed out in the ensuing description, are attained by providing a hydrocarbon composition capable of decomposing into a useful fuel composition, preferably a conjugated diolefin, in heat exchange relation with surfaces to be cooled, whereby heat from said surface is absorbed and the hydrocarbon composition decomposed is subsequently burned as a fuel.

Figure 2:
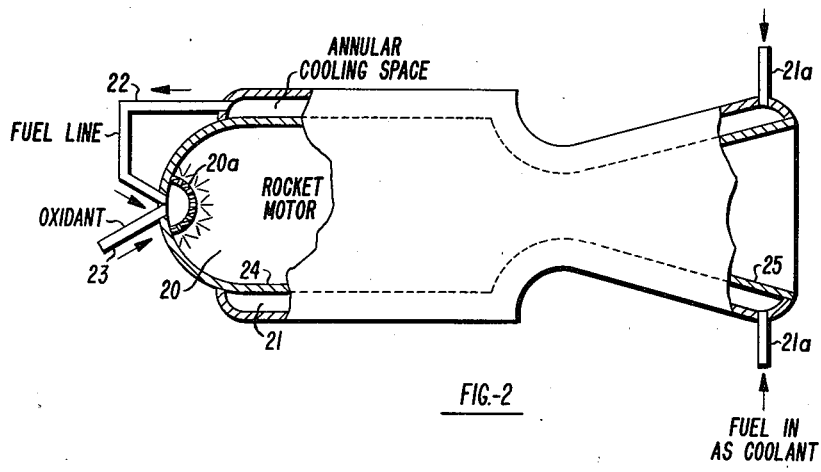

The present invention may be more fully understood by reference to the accompanying drawings, in which:

Figure 1 is a diagrammatic representation illustrating a system to be employed in supplying a fuel to a jet engine utilizing the principles of the present invention; and Figure 2 is a diagrammatic representation showing a design for the combustion chamber of a rocket motor employing the principles of the present invention.

Referring now to the drawings, and specifically to the embodiment illustrated by Figure 1, there is schematically illustrated a fuel supply system for a jet engine in which the fuel tank 10 is connected to the combustion chamber 11 by a liquid fuel line 12 and a vapor fuel line 13. Since fuel for an airplane is normally stored in the wing, the outer surface 14 will be exposed directly to the atmosphere. In the past, it has been necessary either to provide heavy insulation around the fuel tank 10 or to maintain it under high pressure, or both, in order to maintain the fuel in liquid form during operation of the engine. It is obviously desirable to store the fuel in liquid rather than vapor form in order to effect space economies. According to the present invention, however, the maintenance of high pressures or the use of heavy insulating material is unnecessary, since the fuel employed in the tank contains, as a principal active ingredient, a hydrocarbon composition capable of decomposing into a useful fuel such as a conjugated diolefin at elevated temperatures. The term "elevated temperatures" for purposes of the present invention refers to those in excess of about 100° C. The preferred fuel constituent to be employed is dicyclopentadiene, which will decompose at temperatures of 130°–150° C. into cyclopentadiene, a conjugated diolefin. Conjugated diolefins constitute a preferred class of fuels for reaction motors. Other substances decomposing into conjugated diolefins and applicable to the present invention include methyl dicyclopentadiene, dimethyldicyclopentadiene, and homologues thereof, as well as butadiene dimer, butadieneisoprene codimer, etc. It is within the purview of the present invention that the dicyclopentadiene, when employed as the principal fuel constituent, may be mixed with other substances such as those formed as by-products during its manufacture. Dicyclopentadiene is itself a by-product of the high temperature steam cracking of gas oil. A typical material useful in the present invention has the following composition:

| Compound: | Volume percent |
|---|---|
| Dicyclopentadiene | 69.9 |
| Methyldicyclopentadiene | 20.4 |
| Acylic dienes (isoprene, etc.) | 3.4 |
| Codimer—mol. wt. 134 (dicyclopentadiene codimer with isoprene, etc. side chain) | 4.4 |
| Codimer—mol. wt. 148 (methyl dicyclopentadiene with isoprene, etc. side chain) | 1.3 |
| Dimethyl dicyclopentadiene | 0.6 |

At the beginning of a flight, the principal fuel constituent in tank 10 consists almost entirely of liquid polymer. It is preferable to provide means for introducing the fuel from line 12 into the combustion chamber 11 in spray form so as to promote reactive contact between it and the oxidant introduced via line 12a. A preferred oxidant is fuming nitric acid, but other materials commonly used for the same purpose, such as air or oxygen, may also be employed. As speed increases, friction of the air with the outer surface 14 generates a substantial amount of heat, which, at speeds in excess of 1000 miles per hour, may reach the order of 350°–500° F. Since the fuel is in heat exchange relation with the heated surface, heat is absorbed by the fuel until it reaches its decomposition temperature, which in the case of dicyclopentadiene is about 150° C. At this point decomposition of the dicyclopentadiene begins with the material absorbing heat in the amount of 402 B.t.u. per pound. The monomer vapor thus generated passes through the vapor line 13 through the pressure control valve 15 to the combustion chamber 11. The liquid fuel line 12 is provided with a flow control means 17. This flow control means is responsive to temperature changes in the combustion chamber 11 so that the amount of liquid fuel fed may be regulated. In conjunction with the pressure control valve 15 this results in a regulation of the amount of fuel in both liquid polymer and gaseous monomer form fed to the combustion chamber 11. In the case of dicyclopentadiene, the heat of combustion of 2 mols of monomer is substantially higher than that of 1 mol of dimer in the amount of 21.5K cal. As heat is generated on the surface of the fuel tank, fuel is vaporized and the flow of vapor to the combustion chamber increases. Thus, the amount of liquid that must be supplied to maintain combustion is reduced. When the temperature in the combustion chamber exceeds a predetermined value, the liquid flow control means 17 decreases the rate at which liquid fuel is introduced. Since the decomposition point of dicyclopentadiene is about 150° C., the temperature in the fuel tank cannot exceed this value as long as any liquid is present. Because of the high heat of depolymerization of dicyclopentadiene from liquid dimer to vapor monomer, i.e., 402 B.t.u. per pound, and because of its relatively high density of 0.974, it is possible to absorb tremendous amounts of heat from the wings of the aircraft in this manner. At the same time, the fuel can be maintained substantially in liquid form without providing insulating material around the fuel tanks.

Figure 2 illustrates schematically the combustion chamber of a rocket motor which is cooled by dicyclopentadiene or the like. The combustion chamber 20 is surrounded by an annular cooling space 21, into which the liquid polymer is introduced via line 21a and passed on its way to the combustion chamber. The fuel is depolymerized in this space and the resulting vapor is fed through the fuel line 22 to the interior of the chamber together with an oxidant introduced simultaneously through line 23. These materials are generally sprayed into the combustion chamber through a spray head 23a. A portion of the heat generated in the combustion chamber 20 is transferred to the solid materials making up the liner 24 and the nozzle 25. Unless provision is made for withdrawing heat from these materials, their temperature will rise undesirably so that fatigue and mechanical failure will result in a relatively short time. Ordinary hydrocarbons have been used as coolants prior to their combustion, but because of their low heat capacity, difficulty is encountered in obtaining sufficient cooling. By employing a material such as dicyclopentadiene as a fuel-coolant, a greatly increased cooling effect is obtained due to the heat absorbed by depolymerization.

A preferred method of practicing this aspect of the invention involves the maintenance of substantial pressure within the cooling space 21 so that the fuel-coolant is retained in liquid form even after it is converted as by depolymerization. In the case of dicyclopentadiene the heat absorbed by decomposition to cyclopentadiene (232 B.t.u. per pound) even without the additional heat of vaporization (162 B.t.u. per pound) is sufficient to effect substantial cooling. The advantage of operating under high pressure is that a solely liquid fuel is easier to feed to the combustion chamber than a mixture of liquid and vapor.

Another application of the present invention has to do with the lubrication of bearings and the like in jet engines. It is customary to circulate oil at a high rate through these bearings. The oil thus cools as well as lubricates. However, very high rates of flow are necessary, approximating that of the fuel flow rate. This means that a considerable amount of power must be used to pump the lubricating oil. The actual lubricating of the bearing itself can, in fact, be accomplished using a very small amount of oil. If sufficient cooling is provided, the oil flow rate can be greatly reduced without impairing lubrication and with resultant substantial power savings.

It has been found that if a material such as dicyclopentadiene is blended with a lubricating oil, the heat of depolymerization absorbed by the dicyclopentadiene exerts a refrigerating effect on the lubricant. Either a natural or a synthetic lubricating oil may be used. The resulting monomer is then fed to the combustion chamber of the engine where it is burned.

An synthetic lubricating oil suitable for lubricating bearings in jet engines would have the following heat absorption characteristics:

| | |
|---|---|
| Specific heat | 0.65. |
| Temperature difference between bulk oil temperature and bearing outlet temperature | 75° F. |
| B.t.u. absorbed per pound of oil circulated | 49. |

A blend consisting of 90% dicyclopentadiene and 10% by weight of the same synthetic oil would have the following heat absorption characteristics:

| | |
|---|---|
| Specific heat | 0.65. |
| Difference between bulk oil temperature and bearing outlet temperature | 225° F. |
| Heat absorbed in raising temperature of one pound of oil to bearing temperature | 146 B.t.u. |
| Heat absorbed by depolymerizing 0.9 pound of dicyclopentadiene | 362 B.t.u. |
| Total heat absorbed per pound of lubricant | 508 B.t.u. |

The composition containing the dicyclopentadine, then, is capable of absorbing 508 divided by 49, or 10.2 times as much heat per pound as the conventional lubricant. From the heat absorbed viewpoint, the flow rate to the bearing could be reduced to 1/10 the normal rate. In addition to substantial savings in pumping, a much smaller amount of lubricating oil could be employed, namely, that required only for the lubricating of the bearings, etc.

In many cases it is desirable to employ a natural lubricating oil that can be burned in conjunction with the normal fuel. The application of the present invention to such lubricants permits so-called "one-pass" lubrication in which the lubricant is passed from the bearing to the combustion chamber. The lubricant thus augments the regular fuel supply and permits the use of less fuel.

While the invention has been described with respect to a number of specific applications thereof utilizing particular materials, it will be, of course, understood that the present invention is equally applicable to those equivalent materials exhibiting like characteristics and to applications other than jet aircraft or rockets in which a problem of dissipating heat exists, and in which a hydrocarbon fuel is employed.

What is claimed is:

1. A process for operating an engine utilizing a hydrocarbon fuel and wherein surface heating occurs, comprising the steps of passing a hydrocarbon fuel consisting essentially of a principal amount of a hydrocarbon selected from the group consisting of dicyclopentadiene, methyl dicyclopentadiene, dimethyl dicyclopentadiene, a butadiene dimer, and a butadiene-isoprene codimer capable of conversion to a conjugated diolefin by the absorption of heat in heat exchange relation to the surface being heated, depolymerizing said hydrocarbon by the absorption of sufficient heat from said surface to form a conjugated diolefin, and subsequently burning said conjugated diolefin in said engine.

2. The process according to claim 1 wherein said hydrocarbon is dicyclopentadiene.

3. The process according to claim 1 wherein said hydrocarbon is methyl dicyclopentadiene.

4. The process according to claim 1 wherein said hydrocarbon is dimethyl dicyclopentadiene.

5. The process according to claim 1 wherein said hydrocarbon is butadiene dimer.

6. The process according to claim 1 wherein said hydrocarbon is butadiene-isoprene codimer.

7. The process of operating a rocket motor having liner and nozzle portions comprising the steps of passing a hydrocarbon composition comprising a material consisting essentially of a principal amount of a hydrocarbon selected from the group consisting of dicyclopentadiene, methyl dicyclopentadiene, dimethyl dicyclopentadiene, a butadiene dimer, and a butadiene-isoprene codimer capable of conversion to a conjugated diolefin by the absorption of heat in heat exchange relation with said liner and said nozzle, depolymerizing said material by the absorption of sufficient heat whereby said material is converted to a conjugated diolefin, and subsequently burning said diolefin as a fuel in said rocket motor.

8. The process of operating a rocket motor having liner and nozzle portions and an annular cooling space in heat exchange relation with said liner and nozzle comprising the steps of introducing dicyclopentadiene into said cooling space, depolymerizing said dicyclopentadiene to cyclopentadiene by the absorption of sufficient heat from said nozzle and liner, injecting said cyclopentadiene into said rocket motor, and burning it therein as a fuel.

9. The process according to claim 8 wherein sufficient pressure is maintained in said cooling space to retain said dicyclopentadiene and said cyclopentadiene in liquid form.

10. A process for operating an engine utilizing a dicyclopentadiene fuel and wherein surface heating occurs, comprising the steps of passing a dicyclopentadiene fuel capable of conversion by depolymerization to a useful fuel and of absorbing heat incident to said depolymerization in heat exchange relation with the surface being heated, depolymerizing said fuel by the absorption of sufficient heat from said surface to form a useful fuel, vaporizing said useful fuel by the absorption of sufficient heat from said surface and subsequently burning said fuel in said engine.

References Cited in the file of this patent

UNITED STATES PATENTS

| | | |
|---|---|---|
| 2,655,786 | Carr | Oct. 20, 1953 |
| 2,695,496 | Goddard | Nov. 30, 1954 |
| 2,712,497 | Fox et al. | July 5, 1955 |
| 2,722,100 | Goddard | Nov. 1, 1955 |
| 2,842,936 | Ayers et al. | July 15, 1958 |

FOREIGN PATENTS

| | | |
|---|---|---|
| 627,386 | Great Britain | Aug. 8, 1949 |

OTHER REFERENCES

Zucrow: "Journal of the American Rocket Society," No. 72, December 1947, pages 26–44.